United States Patent [19]

Hartig et al.

[11] 4,072,911
[45] Feb. 7, 1978

[54] DYESTUFF LASER

[75] Inventors: Wolfgang Hartig, Bornheim-Hersel; Herbert Walther, Junkersdorf; Adolf Friedrich; Roderich Raue, both of Leverkusen, all of Germany

[73] Assignee: Bayer Aktiengesellschaft, Leverkusen-Bayerwerk, Germany

[21] Appl. No.: 573,785

[22] Filed: May 1, 1975

[30] Foreign Application Priority Data

May 4, 1974 Germany .................. 2421607

[51] Int. Cl.$^2$ .................. H03F 3/00; F21K 2/00
[52] U.S. Cl. .................. 331/94.5 L; 252/301.17
[58] Field of Search .............. 252/301.17; 331/94.5 L

[56] References Cited

U.S. PATENT DOCUMENTS 3,521,187  7/1970  Snavely et al. .............. 331/94.5
3,873,940  3/1975  Drexhage .................. 331/84.5 L

FOREIGN PATENT DOCUMENTS 2,113,127  7/1973  Germany.

OTHER PUBLICATIONS

Dye Lasers by Schafer et al., pp. 168, 169; Pub. by Springer-Verlag, New York, 1973.
Schafer, Airgew. Chem. International Ed., vol. 9, No. 1, p. 23, (1970).

Primary Examiner—F. C. Edmundson
Attorney, Agent, or Firm—Plumley and Tyner

[57] ABSTRACT

A dyestuff laser which consists of a reservoir for the dyestuff solution and an energy source, coupled thereto, which is capable of exciting the dyestuff solution to produce an emission, the radiation generated lying in the wavelength range of 550 to 680 nm. The dyestuff is a sulforhodamine.

4 Claims, 4 Drawing Figures a RHODAMINE 6G
b RHODAMINE B
c DYESTUFF ACCORDING TO EXAMPLE I a RHODAMINE 6G
b RHODAMINE B
c DYESTUFF ACCORDING TO EXAMPLE I

DYESTUFF LASER

The subject of the invention is a process for generating coherent frequency-variable monochromatic radiation (laser light) by means of a dyestuff laser which consists of a reservoir for the dyestuff solution and an energy source, coupled thereto, which is capable of exciting the dyestuff solution to produce an emission, the radiation generated lying in the wavelength range of 550 to 680 nm.

A laser is a light amplification device by means of which it is possibble to generate coherent monochromatic light of a high spectral and geometrical intensity density. The laser consists of an optical resonator which contains the liquid laser-active material in a thin walled quartz cylinder. The cylinder is usually part of a closed system through which the dyestuff solution is circulated by pumping whilst the laser is in operation. This avoids local overheating which leads to optical inhomogeneities.

The dyestuffs are excited with the aid of energy sources, by means of electrons or light, and the dyestuff laser can also be excited by a gas laser, for example a nitrogen laser or argon laser.

The excitation, also described as optical pumping, has the effect that the electrons of the molecule of the laser dyestuff are raised from the ground state to a high energy state, from which a radiation transition takes place. If the number of molecules present in the excited state exceeds the number of molecules present in lower states, stimulated transitions take place, as a result of which the light is amplified in the optical resonator.

If one of the laser mirrors partially transmits light, a part of the radiation issues from the apparatus in the form of a laser beam. Dyestuffs which are particularly easy to excite show, on very effective excitation, the phenomenon of "super-radiance". This can be observed, for example, when a quartz cell containing the solution of such a dyestuff is placed in the beam of a nitrogen laser. The solution hereupon sends out laser light without being located between two resonator mirrors.

A significant advantage of the dyestuff laser in comparison to solid lasers or gas lasers is its ability to provide a frequency-variable laser radiation. Because of the fluorescence band width of the dyestuffs employed, dyestuff lasers can be adjusted, by inserting a frequency-selective element, for example a reflection grating or a prism, so that laser light is emitted at any desired wavelength within the entire fluorescence band of the dyestuff.

Though a large number of suitable dyestuffs has already been proposed, there is nevertheless still, in many regions of the visible wavelength range, a considerable lack of compounds which give a very high efficiency of the laser.

Accordingly, the subject of the invention is a dyestuff laser consisting of a reservoir containing a laser dyestuff solution and a pumping light source coupled thereto, which is capable of exciting the dyestuff solution so that it emits, characterised in that the dyestuff solution contains, in a solvent which does not interfere with the emission, a dyestuff of the general formula

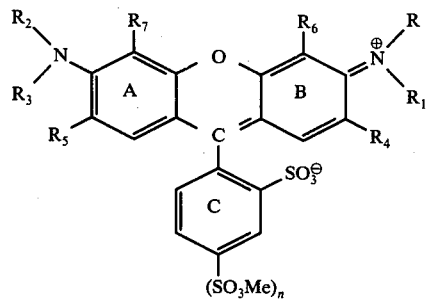

wherein
R and $R_2$ independently of one another represent hydrogen, alkyl, cycloalkyl or aralkyl or can form, with $R_6$ or $R_7$ respectively, a partially hydrogenated 5-membered or 6-membered heterocyclic ring, or can form, with $R_1$ or $R_3$ respectively, a hydrogenated 5-membered or 6-membered heterocyclic ring, $R_1$ and $R_3$ independently of one another represent hydrogen, alkyl, aryl, cycloalkyl or aralkyl, or can form, with $R_4$ or $R_5$ respectively, a partially hydrogenated 5-membered or 6-membered heterocyclic ring, or can form, with R or $R_2$ respectively, a hydrogenated 5-membered or 6-membered heterocyclic ring, $R_4$ and $R_5$ independently of one another represent hydrogen, alkyl, alkoxy or halogen or form, with $R_1$ or $R_3$ respectively, a partially hydrogenated 5-membered or 6-membered heterocyclic ring, $R_6$ and $R_7$ independently of one another represent hydrogen or can form, with R or $R_2$ respectively, a partially hydrogenated 5-membered or 6-membered heterocyclic ring, Me represents hydrogen, a monovalent or divalent metal cation, or the ammonium monoalkylammonium, dialkylammonium or trialkylammonium radical and $n$ denotes 0 or 1 and wherein
the rings A, B and C and the aliphatic or aromatic radicals contained in the formula can also be substituted further, in a concentration which emits laser beams, preferably of $10^{-2}$ to $10^{-4}$ mol/liter.

Possible alkyl radicals R or $R_1$–$R_7$ are, in particular, those with 1–5 C atoms which can contain further substituents, especially non-ionic substituents, such as halogen, especially chlorine and bromine; cyano; $C_1$–$C_4$-alkoxy, such as methoxy, ethoxy, n-propoxy and n-butoxy; di-$C_1$–$C_4$-alkylamino, such as dimethylamino or diethylamino; N-phenyl-N-$C_1$–$C_4$-alkylamino, such as N-phenyl-N-methylamino; hydroxyl; cycloalkyl, such as cyclohexyl; $C_1$–$C_4$-alkoxycarbonyl, such as methoxycarbonyl, ethoxycarbonyl, β-methoxyethoxycarbonyl, B-ethoxyethoxycarbonyl or n-butoxycarbonyl; N-$C_1$–$C_4$-alkylaminocarbonyl, such as methylaminocarbonyl or ethylaminocarbonyl; di-$C_1$–$C_4$-aminocarbonyl, such as dimethylaminocarbonyl or diethylaminocarbonyl; carbamoyl and thiocyano.

Suitable cycloalkyl radicals R, or $R_1$–$R_3$, are preferably the cyclohexyl or cyclopentyl radical.

The benzyl radical should be mentioned as the preferred aralkyl radical R or $R_1$–$R_3$.

Preferred heterocyclic ring systems which can be formed by R and $R_1$ or $R_2$ and $R_3$ via the shared nitrogen atom are 5-membered or 6-membered N-heterocyclic systems such as pyrrolidine, piperidine, morpholine, N-$C_1$-$C_4$-alkylpiperazine, pyrazoline and isoindoline.

Alkylene groups R or $R_{1-3}$, which are linked via $R_{4-7}$ to the rings A or B, preferably contain two or three C chain members and can in addition be substituted, especially by methyl radicals.

The ethylene and 1,3-propylene radical and the group —$C(CH_3)_2$—$CH_2$—$CH(CH_3)$— may be mentioned as examples of such alkylene groups.

The following may be mentioned as examples of substituents in the rings A, B and C: $C_1$-$C_5$-alkyl radicals, which can also be substituted further, such as methyl, trifluoromethyl, ethyl, $\beta$-cyanoethyl and tertiary butyl; 5-membered or 6-membered cycloalkyl radicals, such as cyclohexyl; the phenyl radical; phenyl-$C_1$-$C_3$-alkyl radicals, such as benzyl; halogeno radicals, such as chlorine, bromine or fluorine, preferably chlorine; $C_1$-$C_5$-alkoxy radicals, such as methoxy, ethoxy, n-butoxy and isopropoxy; the phenoxy radical; $C_1$-$C_5$-alkylsulphonyl radicals, such as methylsulphonyl, ethylsulphonyl, n-butylsulphonyl and $\beta$-hydroxyethylsulphonyl; the benzylsulphonyl radical; the phenylsulphonyl radical; carbamoyl or sulphamoyl radical, which are also optionally substituted by one or two $C_1$-$C_4$-alkyl radicals which together with the shared N atom can form a heterocyclic 5-membered or 6-membered ring, such as, for example, $CONH_2$, $SO_2NH_2$, dimethylamino-carbonyl or -sulphonyl, diethylamino-carbonyl or -sulphonyl, N-piperidino-carbonyl or -sulphonyl, N-morpholino-carbonyl or -sulphonyl, N-pyrrolidino-carbonyl or -sulphonyl, n-butylamino-carbonyl or -sulphonyl and $\beta$-hydroxyethylamino-carbonyl or -sulphonyl; the cyano radical; the sulpho radical.

Possible cations Me are monovalent and divalent metals such as sodium, potassium, lithium, magnesium, calcium, barium, manganese and zinc.

Suitable monoalkylammonium, dialkylammonium and trialkylammonium salts are obtained by reaction of the dyestuff-acid with monomethylamine, dimethylamine and trimethylamine, monoethylamine, diethylamine and triethylamine, monoethanolamine, diethanolamine and triethanolamine, methyldiethanolamine, ethyldiethanolamine, dimethylethanolamine, diethylethanolamine, monoisopropanolamine, diisopropanolamine and triisopropanolamine, methyldiisopropanolamine, ethyldiisopropanolamine, dimethylisopropanolamine, diethylisopropanolamine, n-butylamine, sec.butylamine, dibutylamine and diisobutylamine.

Preferred laser dyestuffs of the formula I are those in which $n = 1$.

Laser dyestuffs which are, in turn, preferred amongst these correspond to the formula

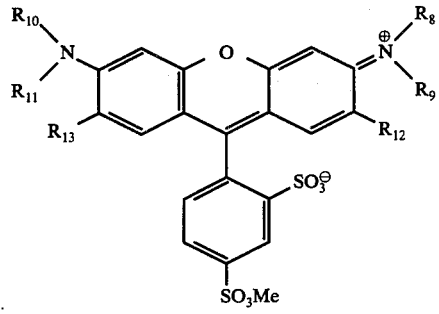

II wherein $R_8$ and $R_{10}$ represent alkyl radicals with 1–4 C atoms,
$R_9$ and $R_{11}$ represent hydrogen or alkyl radicals with 1–4 C atoms,
$R_{12}$ and $R_{13}$ denote hydrogen or alkyl radicals with 1–4 C atoms and
Me represents hydrogen, potassium, sodium, ammonium, monoalkylammonium, dialkylammonium or trialkylammonium ions, with alkyl representing $C_1$-$C_4$-alkyl.

Examples of solvents which can be used according to the invention and which do not interfere with the stimulated emission are water, monohydric or polyhydric alcohols, for example methanol, ethanol, isopropanol, butanol, ethylene glycol and glycol monoethyl ether, cyclic ethers, such as tetrahydrofurane and dioxane, aromatic compounds, such as benzene, toluene, phenol, resorcinol and cresols, and also cyclohexane, decalin, chloroform, dimethylsulphoxide, ketones, such as acetone, butanone-2 and cyclohexanone, esters, such as ethyl acetate, malonic acid diethyl ester, glycol diacetate and diethyl carbonate, and fluorinated alcohols, for example hexafluoroisopropanol.

Laser light from frequency-variable lasers has attained considerable importance in spectroscopy in recent years. The lasers can be employed for analytical purposes, high resolution spectroscopy, fluorescence spectroscopy, absorption spectroscopy, half-life measurements, photoionisation and the spectroscopy of negative ions.

They are furthermore of great technical importance in information technology, in protection of the environment and in isotope separation.

A number of the dyestuffs show, as a particular advantage, the effect of "super-radiance" described supra.

EXAMPLE 1

The dyestuff of the formula

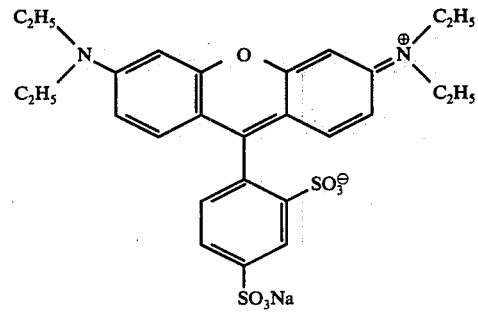

was examined, in the continuous dyestuff laser of Hercher and Pike [(M. Hercher and H. A. Pike, Opt. Comm. 3, 65 (1971)] for dependence of the laser emission on the wavelength (FIG. 1).

Figure 1:
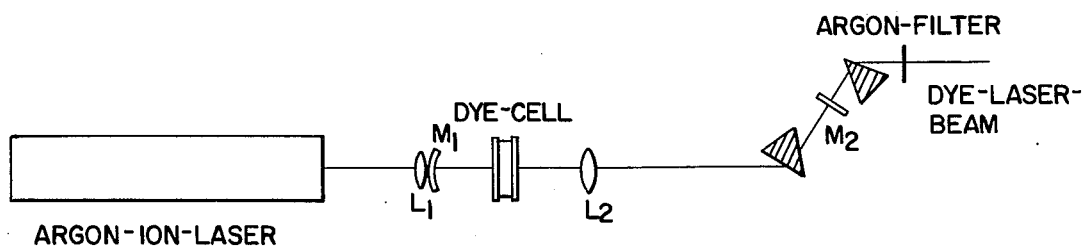
FIG. 1 illustrates the laser resonator described in Example 1 of the specification.

With reference to FIG. 1, the laser resonator consists of the spherical mirror $M_1$ and the plane mirror $M_2$; the resonator length was 20 cm. The dyestuff solution, which circulated through the dyestuff cell at a flow rate of 15 m/sec, was excited with line 5145 A of an argon ion laser. For this purpose, the pumping light was focused into the cell by means of the lens $L_1$. The lens $L_2$ serves to adapt the modal volume of the resonator to the optically pumped dyestuff volume.

A coarse selection of the wavelength was made by means of the dispersion of a prism which was placed in the path of the beam, at the Brewster angle.

The laser was set by rotating this prism. The line width of the spectral distribution of the laser was approx. 1 A. Further narrowing of the line width in the range of the order of magnitude of a megacycle (about $10^{-5}$ A) is possible without difficulty.

The second external prism served for the horizontal redirection of the laser beam.

For measurement, the laser beam was divided into two beams, in the ratio of 1:1, by means of a beam divider. One beam was used to examine the wavelength of the laser emission by means of a monochromator, whilst the second beam was used to measure the output with the aid of a bolometer.

Doubly distilled water was used as the solvent for the dyestuff investigated. The concentration throughout was $4.5 \times 10^{-4}$ mol/liter with the addition of 2% of a cationic surface-active substance. The criterion of the correct concentration was minimum pumping output at the laser threshold.

The measurements were carried out with a pumping output of the argon ion laser of 1.5 watt, that is to say approx. 1 watt above the laser threshold. The results are shown Compared to the known laser dyestuffs Rhodamine B and Rhodamine 6G, the laser dyestuff used according to the invention shows, surprisingly, a significantly broadened maximum. The laser excitation region is unexpectedly displaced markedly towards longer wavelengths.

Equally good laser excitation is achieved if instead of the sodium salt used in the above example, the potassium, ammonium, trimethylammonium or triethanolammonium salt is used.

EXAMPLE 2

The dyestuff of the formula

Figure 3:
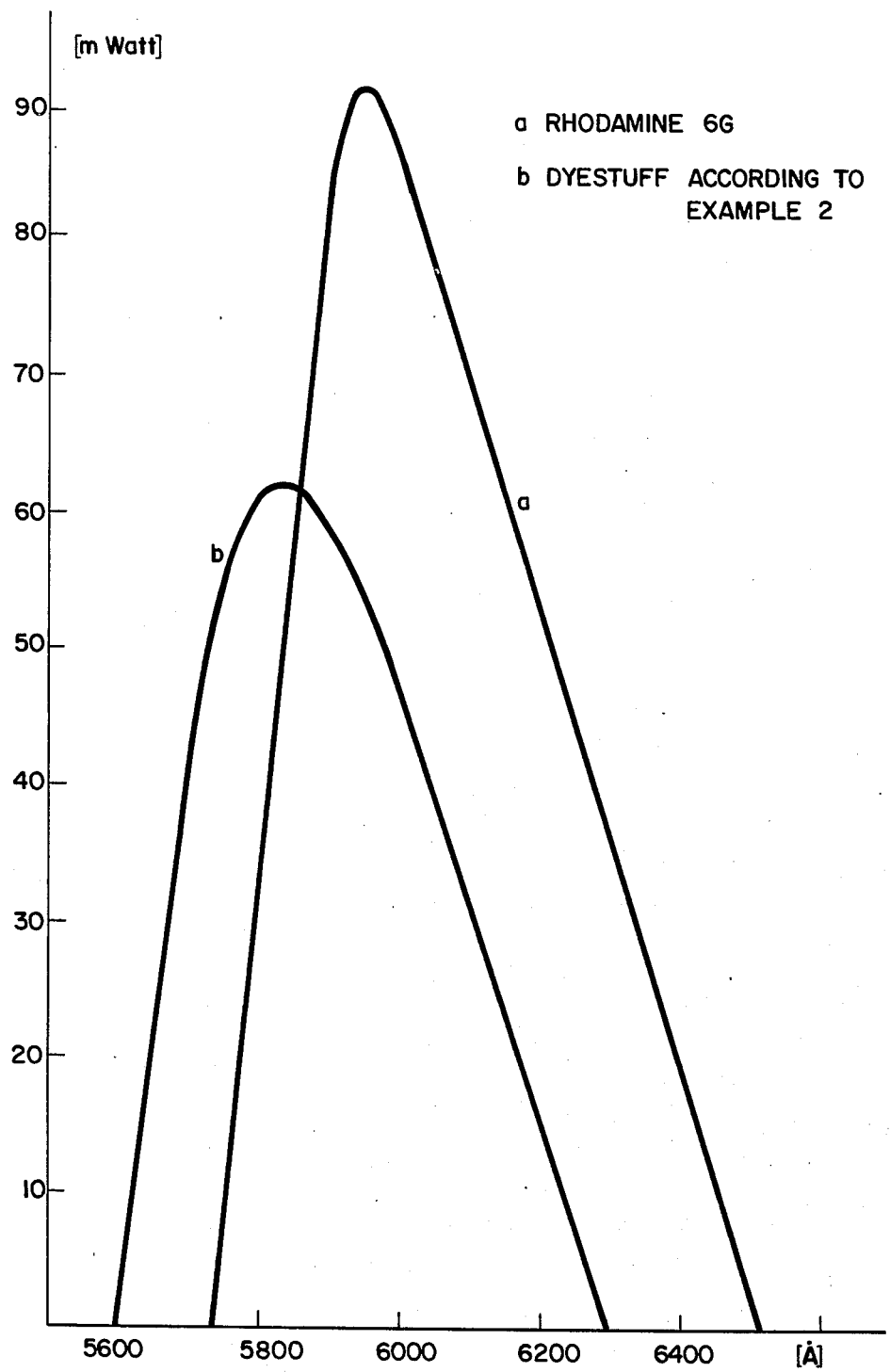
FIG. 3 illustrates graphically the spectral distribution of the laser emission of the dyestuff of Example 2 as compared to a known laser dyestuff.

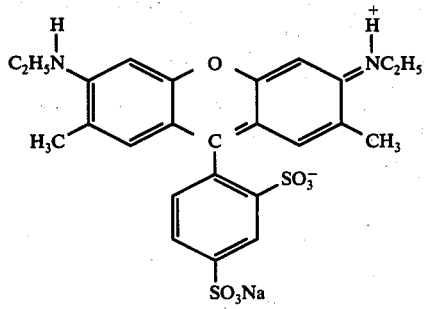

was examined, in the apparatus described in Example 1, for dependence of the laser emission on the wavelength. The concentration of the dyestuff and the pumping output of the argon ion laser were the same as in Example 1. The result is shown in FIG. 3.

Compared to the known laser dyestuff Rhodamine 6G, the laser dyestuff used according to the invention shows a maximum displaced by 15 nm towards shorter wavelengths. The breadth of action of the dyestuff laser is found to be broadened, in a highly desired manner.

EXAMPLE 3

The dyestuff of the formula

Figure 4:
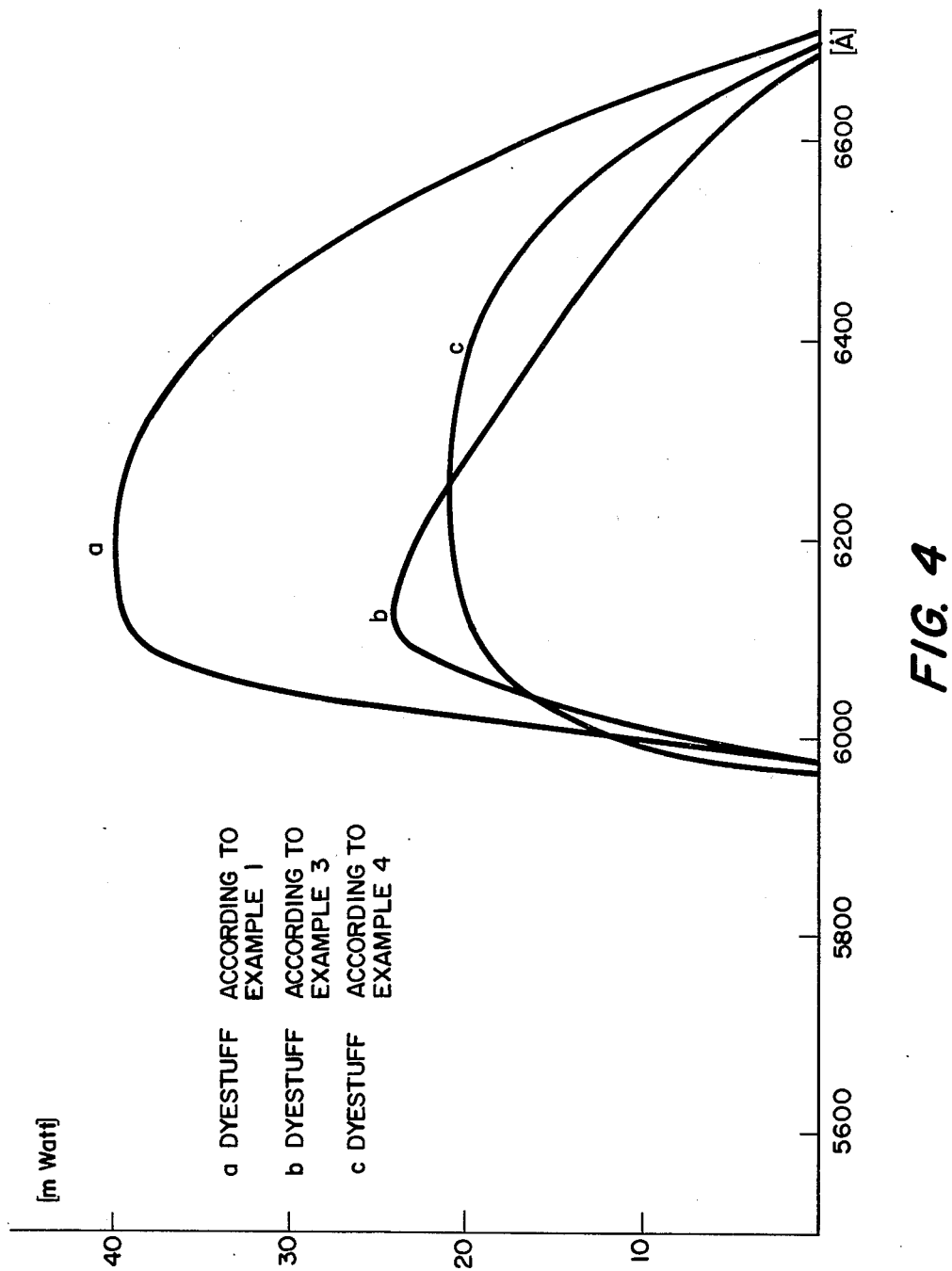
FIG. 4 illustrates graphically the spectral distribution of the laser emission of the dyestuff of Example 3 as compared to the dyestuffs of Examples 1 and 2.

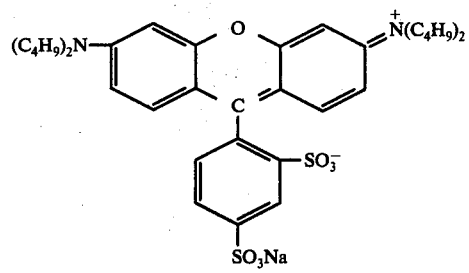

was examined, in the apparatus described in Example 1, for dependence of the laser emission on the wavelength. The experimental conditions were the same and the result is shown in FIG. 4. Compared to the known laser dyestuff Rhodamine 6G, the laser dyestuff used according to the invention surprisingly shows a significantly broadened maximum. The region of laser excitation is unexpectedly displaced markedly towards longer wavelengths and lies in the region of the dyestuff according to the invention described in Example 1.

EXAMPLE 4

The dyestuff of the formula

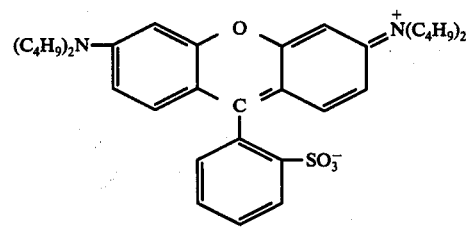

was examined, in the apparatus described in Example 1, for dependence of the laser emission on the wavelength. The experimental conditions were the same and the result is shown in FIG. 4. Compared to the known laser dyestuff Rhodamine 6G, the laser dyestuff used according to the invention surprisingly shows a significantly broadened maximum. The region of laser excitation is unexpectedly displaced markedly towards longer wavelengths and lies in the region of the dyestuff according to the invention described in Example 1.

Figure 2:
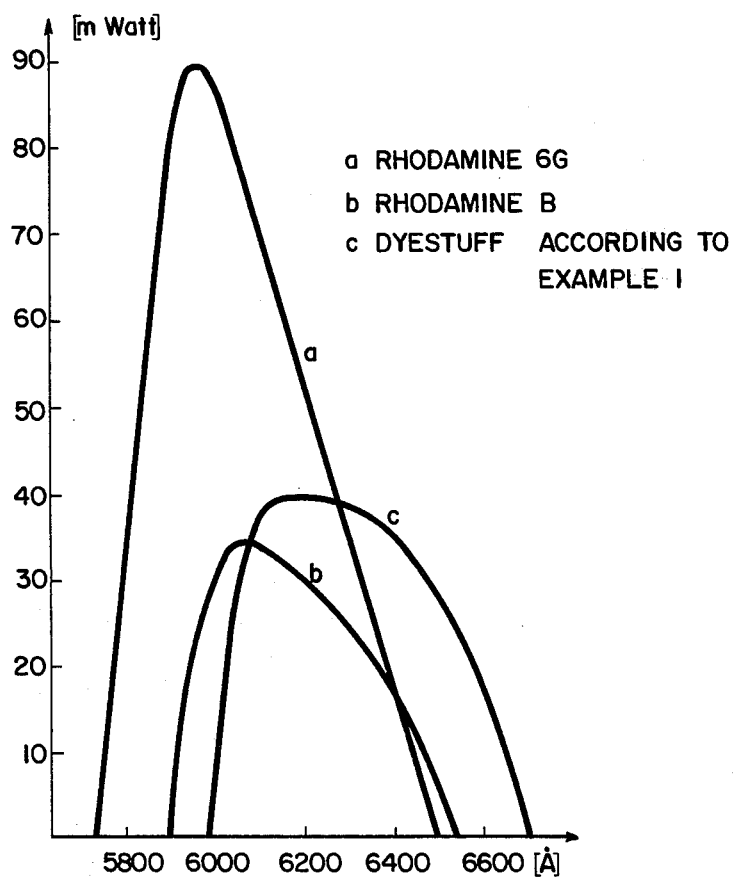
FIG. 2 illustrates graphically the spectral distribution of the laser emission of the laser dyestuff of Example 1 as compared to known laser dyestuffs.

The dyestuffs of the table which follows can be used in the same way as laser dyestuffs, the dyestuffs with a secondary amino group (Example 2) showing spectral distributions of the laser emission corresponding to FIG. 3 and the dyestuffs with a tertiary amino group (Examples 1, 3 and 4) showing spectral distributions of the laser emission corresponding to FIG. 2 and FIG. 4.

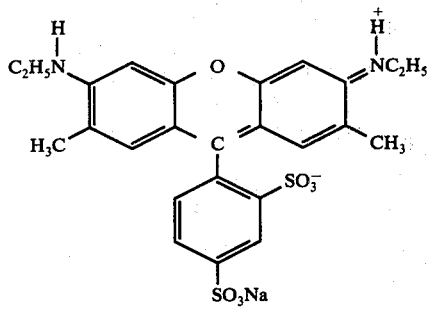

| Example | $R_1$ | $R_2$ | $R_3$ | n |
|---|---|---|---|---|
| 5 | $CH_3$ | $CH_3$ | H | 1 |
| 6 | $CH_3$ | $C_2H_5$ | H | 1 |
| 7 | $CH_2C_6H_5$ | $C_2H_5$ | H | 1 |
| 8 | $CH_2C_6H_5$ | $CH_2C_6H_5$ | H | 1 |
| 9 | $CH_2C_6H_5$ | H | $CH_3$ | 1 |
| 10 | $C_3H_7(i)$ | H | $OCH_3$ | 1 |
| 11 | $C_4H_9$ | H | $OCH_3$ | 1 |
| 12 | $C_2H_5$ | H | Cl | 1 |
| 13 | $C_2H_5$ | $C_2H_5$ | H | 0 |
| 14 | $CH_3$ | $CH_3$ | H | 0 |
| 15 | —⟨H⟩ | $C_2H_5$ | H | 1 |
| 16 | $C_2H_4OCH_3$ | $C_2H_5$ | H | 1 |
| 17 | $C_2H_4OC_2H_5$ | $C_2H_5$ | H | 1 |
| 18 | $C_2H_4CN$ | $C_2H_5$ | H | 1 |
| 19 | $C_2H_4Cl$ | $C_2H_5$ | H | 1 |
| 20 | $C_2H_4OCH_3$ | $C_2H_4OCH_3$ | H | 1 |
| 21 | —CH₂CH₂—⟨⟩ | $CH_3$ | H | 1 |
| 22 | —CH₂CH₂O—⟨⟩ | $CH_3$ | H | 1 |
| 23 | $R_1 + R_2$ <br> CH₂—CH₂<br>       \\ O<br> CH₂—CH₂ |  | H | 1 |
| 24 | H | $R_2 + R_3$<br>—CH₂<br>—CH—CH₃ |  | 1 |
| 25 | H | $R_2 + R_3$<br>—CH₂<br>   CH₂<br>—CH₂ |  | 1 |

We claim:
1. Dyestuff laser capable of generating a coherent emission in a wavelength range of 550 to 680 nm consisting of a reservoir containing a laser dyestuff solution and a pumping light source coupled thereto capable of exciting the dyestuff solution so that it emits, in which said dyestuff solution comprises a solvent which does not interfere with the emission and a concentration sufficient to emit laser beams of a dyestuff of the formula

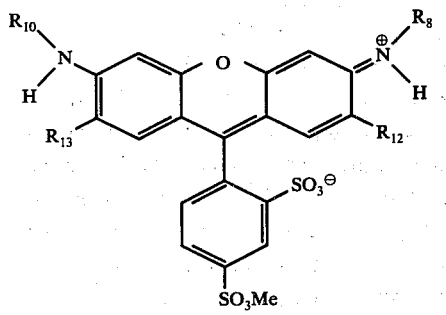

wherein:
$R_8$ and $R_{10}$ are alkyl of 1–4 C atoms;
$R_{12}$ and $R_{13}$ are hydrogen or alkyl of 1–4 C atoms; and
Me is hydrogen, potassium, sodium, ammonium monoalkylammonium, dialkylammonium or trialkylammonium ions, said alkyl containing 1–4 C atoms.

2. Dyestuff laser of claim 1 in which said dyestuff has the formula

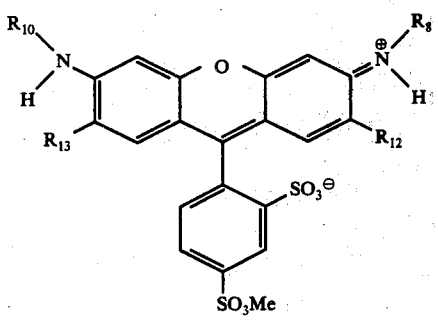

3. Process for generating a laser emission in a wavelength range of 550 to 680 nm using a dyestuff laser consisting of a reservoir containing a laser dyestuff solution and a pumping light source coupled thereto capable of exciting the dyestuff solution so that it emits, in which said dyestuff solution comprises a solvent which does not interfere with the emission and a concentration sufficient to emit laser beams of a dyestuff of the formula

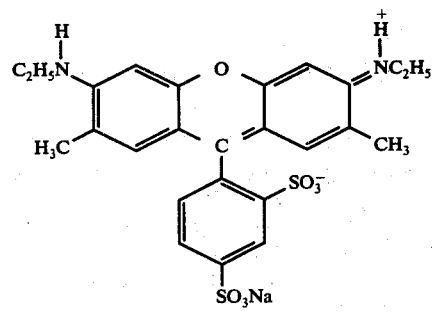

wherein
$R_8$ and $R_{10}$ are alkyl of 1–4 C atoms;
$R_{12}$ and $R_{13}$ are hydrogen or alkyl of 1–4 C atoms; and
Me is hydrogen, potassium, sodium, ammonium monoalkylammonium, dialkylammonium or trialkylammonium ions, said alkyl containing 1–4 C atoms.

4. Process of claim 3 in which said dyestuff has the formula

* * * * *